Figure 1:
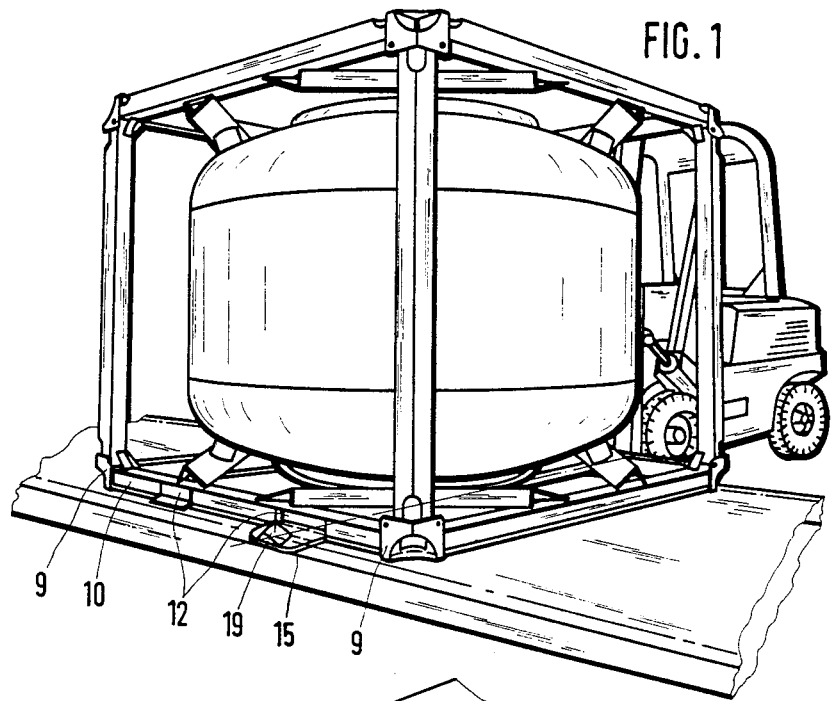

United States Patent [19]
Gerhard

[11] Patent Number: 4,768,906
[45] Date of Patent: Sep. 6, 1988

[54] DEVICE FOR LOCKING A UNIT LOAD

[75] Inventor: Helmut Gerhard, Weitefeld, Fed. Rep. of Germany

[73] Assignee: Westerwaelder Eisenwerk Gerhard GmbH, Weitefeld, Fed. Rep. of Germany

[21] Appl. No.: 45,873

[22] Filed: May 4, 1987

[30] Foreign Application Priority Data

May 6, 1986 [DE] Fed. Rep. of Germany ....... 3615354

[51] Int. Cl.$^4$ .......................... B60P 7/13; B65D 19/38
[52] U.S. Cl. ........................................ 410/84; 410/82; 24/287; 248/500
[58] Field of Search ....................... 410/52, 71, 73, 76, 410/77, 80–82, 84, 90, 91; 24/287, 330, 522; 220/1.5; 248/500, 503

[56] References Cited

U.S. PATENT DOCUMENTS

| 2,699,735 | 1/1955 | Williams | 410/80 |
| 3,602,474 | 8/1971 | Deering | 410/84 |
| 4,185,435 | 1/1980 | Schiffers, Jr. | 248/500 X |
| 4,249,684 | 2/1981 | Miller et al. | 410/82 X |
| 4,322,192 | 3/1982 | Zavada et al. | 410/84 X |
| 4,682,923 | 7/1987 | Gerhard | 410/90 |

FOREIGN PATENT DOCUMENTS 380406 9/1932 United Kingdom ................. 410/77

Primary Examiner—Robert B. Reeves
Assistant Examiner—Scott H. Werny
Attorney, Agent, or Firm—Barnes & Thornburg

[57] ABSTRACT

A container is locked by use of a locking plate (15) which engages a fork-lift opening (12) formed in a lower container frame member (10) and which has a portion (15a) projecting from said opening (12) and formed with a hole (18) for engagement with a twist-lock (19). The opening (12) is disposed at an intermediate position of the frame member (10) between the ends thereof, so that the container is secured against tilting about its front and rear edges. The configurations of opening (12) and locking plate (15) are matched to each other such that the container is also locked against transverse movement.

17 Claims, 2 Drawing Sheets

DEVICE FOR LOCKING A UNIT LOAD

DESCRIPTION

This invention relates to a device for locking a unit load, i.e. a container or a flat, to a locking element by means of a locking plate.

Such a device is described in Applicant's earlier U.S. patent application Ser. No. 819,366, filed Jan. 16, 1986, now U.S. Pat. No. 4,682,923, issued July 28, 1987, where the locking plate is movable in the longitudinal direction of a container frame member and adapted to project outwardly from a corner fitting. As with other, conventional locking devices, the locking point is disposed in the vicinity of the front or rear container edge. In order to eliminate the risk of tilting about the respective front or rear container edge in case of vertical accelerations, which must be taken into account in particular with road vehicles, further securing measures in addition to locking by means of two ISO twistlocks must be provided.

It is an object of the present invention to provide a device by means of which medium-size unit-loads may be locked at only two points in such a way that the risk of tilting is eliminated even in case of vertical accelerations.

This object is met by a device for locking a unit load to a locking element, said load unit including a lower lateral frame member with an opening formed therein at a position spaced from both ends of the frame member, said opening defining a fork-lift channel and having upper and lower edges, the device comprising a locking plate including a first portion for engagement in said opening and a second portion adapted to project from said opening and including a recess for engagement with said locking element, one of said first and second plate portions being longer in the longitudinal direction of said frame member than the lower edge of said opening.

Accordingly, the locking plate used for locking to the respective locking element cooperates with a fork-lift opening which is provided on the side of the unit load in spaced relationship from the two corners thereof. The locking plate and the opening are matched to each other such that a wider portion of the locking plate abuts the outer or inner surface of the wall member having the opening. Since identical locking arrangements are provided at both lateral lower frame members of the unit load, locking is achieved in the transverse direction. Further, since fork-lifting openings regularly provided in containers and flats are utilized for engagement by the locking plate, commonly available unit loads can be locked by said locking plate without requiring special equipment. With the device of the invention, the unit load will be disposed partly in front of and partly behind the locking point and will thus be secured against tilting about both its front and rear edges. Also, the locking plate may be of simple configuration and inexpensive to manufacture, and at the same time permit easy handling in operation.

In an advantageous embodiment, the first portion of the locking plate is longer in the longitudinal direction of the frame member than the lower edge of the opening, and the opening and the plate are configured such that the locking plate can be removed from its locking position, in which it extends substantially parallel to a bottom plane defined by the unit load, by a lifting movement relative to the opening. An even safer locking of the unit load is thus achieved with each individual locking plate which, in this case, engages behind the wall forming the fork-lift opening and may be released from that opening only by an upward movement which may be either a purely translational or a tilting motion.

Further advantageous embodiments relate to configurations of the opening and the locking plate that achieve a particularly secure anchoring or permit particularly inexpensive manufacture and/or easy handling.

Figure 2:
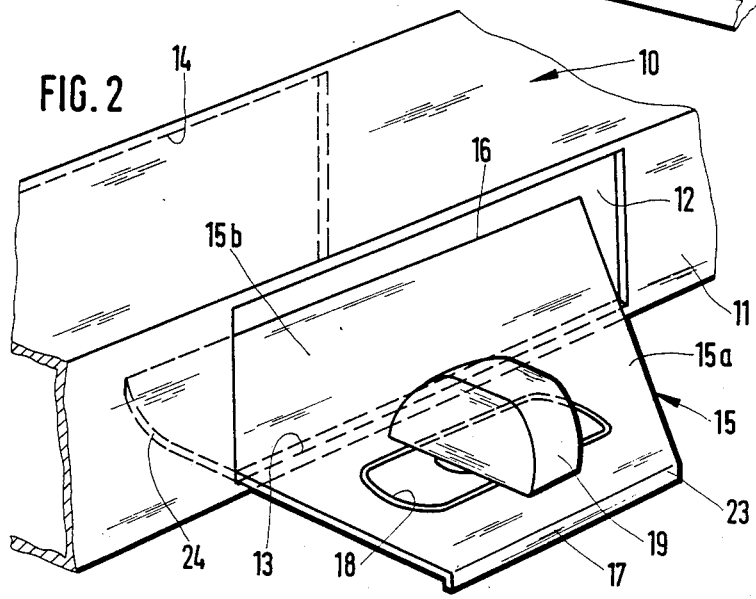
Figure 3:
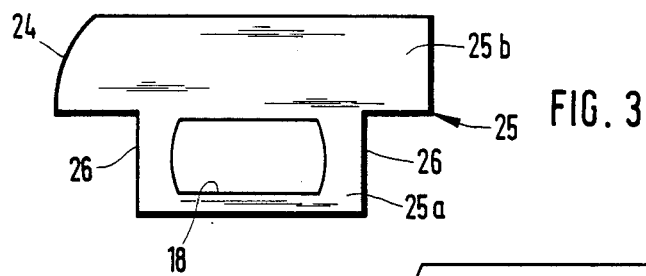
Figure 4:
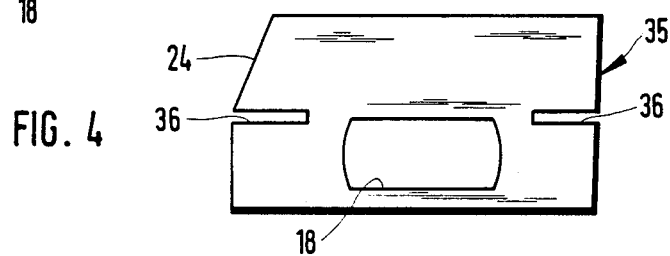
Figure 5:
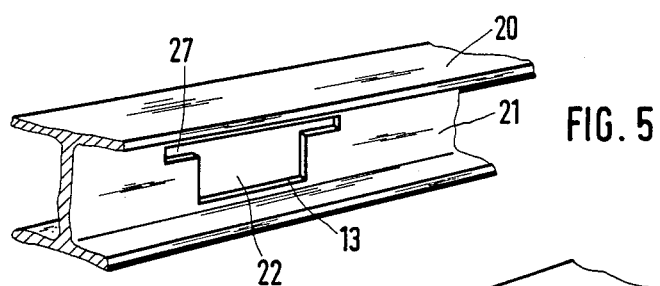
Figure 6:
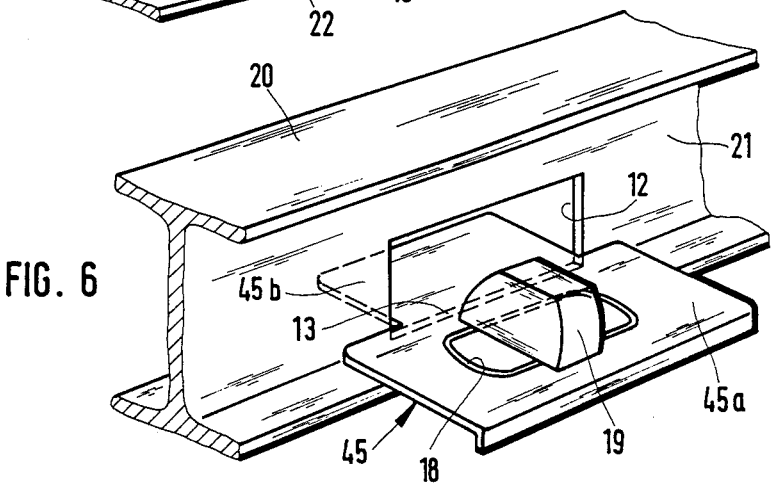

Preferred embodiments of the invention will be explained below with references to the drawings, in which FIG. 1 is a perspective view showing a medium-size container secured to a locking element, FIG. 2 is a partial view of a lower frame member of the container of FIG. 1 with a locking plate being inserted and locked by means of a twist-lock, FIGS. 3 and 4 illustrate other configurations of the locking plate, FIG. 5 shows another embodiment of the container frame member with a fork-lift opening provided therein for accommodating a locking plate; and FIG. 6 illustrates another configuration of the locking plate shown in engagement with a fork-lift opening.

The container shown in FIG. 1 includes a frame the individual frame members of which are interconnected by corner fittings. The lower frame members 10 extending in the longitudinal direction of a truck floor indicated in FIG. 1 are penetrated by fork-lift channels at positions intermediate the corner fittings 9. One of these channels is utilized for fixing the container to locking elements as are provided on loading floors of land crafts for shipping ISO and other large containers.

FIG. 2 is a perspective view showing a portion of a lower frame member 10. The outer wall 11, which is remote from the container, is provided with a rectangular opening 12 having its major length extending in the longitudinal direction of the frame member. In this embodiment, the frame member 10 is constituted by a rectangular tube, and the opening 12 in the wall 11 is aligned with an equal-sized opening 14 in the opposite inner vertical wall; both openings 12 and 14 form a channel for the insertion of a fork-lift arm. In this case, the top flange of the frame member 10 is provided for static reasons with a reinforcing plate (not illustrated) in the vicinity of the openings 12 and 14.

A locking plate 15 is placed in the opening 12 of the frame member 10. According to FIG. 2 the locking plate 15 has a trapezoidal shape, the rear edge 16 of the locking plate 15 being longer than its front edge 17 and longer than the bottom edge 13 of the opening 12. The portion 15a of the locking plate 15 which projects from the opening 12 is formed with an elongated hole 18 for engagement with a twistlock 19 as provided for securing large containers. FIG. 2 shows the twistlock 19 in its locking position. The front edge 17 of the locking plate 15 is provided with a downturned web 23 the height of which is equal to the spacing between the bottom edge 13 of the opening 12 and the floor.

In operation, when the container has been placed onto the loading floor, the rear portion 15b of the locking plate 15 is inserted into the opening 12, wherein the rear edge 16 of the latching plate 15 is aligned with the diagonal of the opening 12 the length of which is slightly larger than the maximum width of the locking plate 15. To facilitate insertion while achieving secure anchoring, the locking plate 15 is rounded off at 24 on its portion 15b engaging in the opening 12. The locking plate 15 can thus be first inserted with its rear right-hand tip, as viewed in FIG. 2, whereupon it is rotated with the rounded-off portion 24 farther inwards in its diagonal orientation. Then, the locking plate 15 is lowered until it rests on the bottom edge 13 of the opening 12, the hole 18 being passed over the twistlock 19 which is at first in a position rotated about 90° relative to the position illustrated in FIG. 2. By rotating the twistlock 19 to the position shown in FIG. 2 the locking plate 15 is then fixed with respect to the bottom edge 13 of the opening 12 and the web 23 is pressed against the loading floor, whereby the container is locked in place.

Since the fork-lift channel is provided in a central part of a longitudinally extending container lower frame member intermediate the two corner fittings, the described way of locking prevents tilting of the container about its front and rear edges. Due to the fact that, as usual, locking in accordance with FIG. 2 takes place also at the opposite longitudinally extending container frame member, the container is secured also against tilting about a longitudinal axis.

In the alternative configuration shown in FIG. 3, the portion 25a of the locking plate 25 which projects from the opening 12 of the container frame member 10 is offset by lateral cut-outs 26 relative to the portion 25b engaging in the opening. In this case both portions 25a, 25b of the locking plate 25 may be rectangular, wherein the portion 25a projecting from the opening and provided with the hole 18 is somewhat shorter than the bottom edge 13 of the opening 12, while the other portion 25b is longer than said edge 13 but slightly shorter than the diagonal dimension of the opening 12. To facilitate rotation into the opening 12, the portion 25b is likewise rounded off at 24.

The locking plate 35 shown in FIG. 4 differs from the locking plate 25 of FIG. 3 in that the lateral cut-outs are configured as mere slots 36.

FIG. 5 shows part of a container frame member 20 in the form of an I-beam having in its central web 21 an opening 22 defining a fork-lift channel. The opening 22 is provided at its upper edge with a slot 27 of a length exceeding that of the major portion of the opening 22. In this case, the wider rear portion of the locking plate 15, 25 or 35 may be passed horizontally through the slot 27 and the plate then lowered vertically.

In the modification of FIG. 6, the locking plate 45 has a wider outer portion 45a provided with the hole 18 for engaging the twistlock 19 and a narrower straight portion 45b for insertion into the opening 12. The portion 45b is somewhat smaller and the portion 45a wider than the opening 12. In this case, the container is secured against displacement towards the twist lock 19. Since fork-lift openings 12 are provided at corresponding locations on both lower longitudinal container frame members 20, the same locking as shown in FIG. 6 may be performed on the opposite side of the container with the result that the container, just as in the embodiment of FIG. 2, is secured against both movement in either lateral direction and tilting about any transverse axis.

I claim:

1. A device for locking a unit load to a vertical pin-type locking element, said unit load including a lower lateral frame member with an opening formed therein at a position spaced from both ends of the frame member, said opening defining a fork-lift channel and having upper and lower edges, the device comprising a one-piece locking plate including a first portion adapted to be inserted into said frame member through said opening for engagement in said opening and a second portion adapted to project from said opening and including a hole for engagement with said locking element, one of said first and second plate portion being longer in the longitudinal direction of said frame member than the lower edge of said opening.

2. A device for locking a unit load to a locking element, said unit load including a lower lateral frame member with an opening formed therein at a position spaced from both ends of the frame member, said opening defining a fork-lift channel and having upper and lower and lower edges, the device comprising locking plate including a first portion for engagement in said opening and a second portion adapted to project from said opening and including a recess for engagement with said locking element, one of said first and second plate portions being longer in the longitudinal direction of said frame member than the lower edge of said opening,
   wherein said first plate portion is longer in the longitudinal direction of said frame member than the lower edge of said opening, said opening and plate being configured such that said plate can be removed from its locking position, in which it extends substantially parallel to a bottom plane defined by said frame member, by being lifted relative to said opening.

3. The device of claim 2, wherein saisd locking plate is of substantially trapezoidal configuration.

4. The device of claim 2, wherein said second portion of the locking plate is separated from said first portion by lateral cut-outs.

5. The device of claim 2, wherein said first portion of the locking plate is rounded off on one side.

6. The device of claim 2, wherein said frame member is an I-beam, said opening being formed in the central web of said I-beam.

7. The device of claim 2, wherein the upper edge of said opening is defined by a slot which has a length exceeding the width of said opening in the longitudinal direction of said frame member.

8. The device of claim 2, wherein the interior diagonal dimension of said opening is larger than the maximum width of said locking plate.

9. A device for locking a unit load to a locking element, said unit load including a lower lateral frame member with an opening formed therein at a position spaced from both ends of the frame member, said opening defining a fork-lift channel and having upper and lower edges, the device comprising locking plate including a first portion for engagement in said opening and a second portion adapted to project from said opening and including a recess for engagement with said locking element, one of said first and second plate portions being lower in the longitudinal direction of siad frame member than the lower edge of said opening,
   wherein the first portion of said locking plate is shorter and the second portion thereof is longer than the lower edge of said opening in the longitudinal direction of said frame member.

10. The device of claim 1, wherein said first plate portion is longer in the longitudinal direction of said frame member than the lower edge of said opening, said opening and plate being configured such that said plate can be removed from its locking position, in which it extends substantially parallel to a bottom plane defined by said frame member, by being lifted relative to said opening.

11. The device of claim 1, wherein said locking plate is of substantially trapezoidal configuration.

12. The device of claim 1, wherein said second portion of the locking plate is separated from said first portion by lateral cut-outs.

13. The device of claim 1, wherein said first portion of the locking plate is rounded off on one side.

14. The device of claim 1, wherein said frame member is an I-beam, said opening being formed in the central web of said I-beam.

15. The device of claim 1, wherein the upper edge of said opening is defined by a slot which has a length exceeding the width of said opening in the longitudinal direction of said frame member.

16. The device of claim 1, wherein the interior diagonal dimension of said opening is larger than the maximum width of said locking plate.

17. The device of claim 1, wherein the first portion of said locking plate is shorter and the second portion thereof is longer than the lower edge of said opening in the longitudinal direction of said frame member.

* * * * *